US012627026B2

(12) United States Patent
Thoren et al.

(10) Patent No.: US 12,627,026 B2
(45) Date of Patent: May 12, 2026

(54) INTEGRATED ANTENNA AND TETHER

(71) Applicant: BAE Systems Information and Electronic Systems Integration Inc., Nashua, NH (US)

(72) Inventors: Matthew D. Thoren, Pelham, NH (US); Gregory T. Nannig, Arlington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 137 days.

(21) Appl. No.: 18/586,794

(22) Filed: Feb. 26, 2024

(65) Prior Publication Data

US 2025/0273862 A1 Aug. 28, 2025

(51) Int. Cl.
*H01Q 1/14* (2006.01)
*H01P 3/10* (2006.01)
(Continued)

(52) U.S. Cl.
CPC ............... *H01Q 1/14* (2013.01); *H01Q 1/087* (2013.01); *H01P 3/10* (2013.01); *H01Q 13/203* (2013.01)

(58) Field of Classification Search
CPC ............ H01Q 1/085; H01Q 9/22; H01Q 9/30; H01Q 9/32; H01Q 9/33; H01Q 9/36; H01Q 1/087; H01Q 1/14; H01Q 17/005
See application file for complete search history.

(56) References Cited

U.S. PATENT DOCUMENTS 4,476,576 A * 10/1984 Wheeler .............. H01Q 1/1292 343/849
4,641,110 A * 2/1987 Smith .................. H01B 11/206 333/243
(Continued)

FOREIGN PATENT DOCUMENTS

| | | | |
|---|---|---|---|
| EP | 1291963 | A1 | 3/2003 |
| GB | 2468583 | A | 9/2010 |
| JP | H03129606 | A | 6/1991 |

OTHER PUBLICATIONS

Hall, Toxey A., "Atmospheric Electricity and Tethered Aerostats," vol. 1 (May 11, 1976), Range Measurements Laboratory, Air Force Eastern Range (AFSC). 255 pages.
(Continued)

*Primary Examiner* — Ab Salam Alkassim, Jr.
*Assistant Examiner* — David Andrew Kubera
(74) *Attorney, Agent, or Firm* — Gary McFaline

(57) ABSTRACT

An integrated antenna and tether structure includes (i) a core including a first dielectric material, (ii) a first layer including a second dielectric material and a first conductive material thereon, the first layer wrapped around at least a section of the core, (iii) a plurality of wires including a second conductive material and wrapped around at least a section of the first layer, (iv) a second layer including a third dielectric material and a third conductive material thereon, the second layer wrapped around at least a section of the plurality of wires, and (v) an outer layer comprising a fourth dielectric material, the outer layer wrapped around at least a section of the second layer. In an example, the antenna structure is to transmit signals at a frequency of at most 50 Megahertz (MHz).

19 Claims, 6 Drawing Sheets

(51) Int. Cl.
*H01Q 1/08* (2006.01)
*H01Q 13/20* (2006.01)

(56) References Cited

U.S. PATENT DOCUMENTS

| | | | |
|---|---|---|---|
| 4,861,947 | A | 8/1989 | Altermatt et al. |
| 4,903,036 | A | 2/1990 | Wheeler |
| 4,939,317 | A * | 7/1990 | Hostler .............. H01B 11/1847 174/120 SR |
| 4,987,394 | A * | 1/1991 | Harman ............... H01Q 13/203 333/237 |
| 7,405,707 | B2 | 7/2008 | Murofushi et al. |
| 7,528,796 | B2 | 5/2009 | Leisten |
| 8,860,545 | B2 | 10/2014 | Singh et al. |
| 9,012,781 | B2 | 4/2015 | Daniel et al. |
| 9,628,116 | B2 | 4/2017 | Henry et al. |
| 10,382,072 | B2 | 8/2019 | Henry et al. |
| 10,446,936 | B2 | 10/2019 | Henry et al. |
| 10,469,107 | B2 | 11/2019 | Henry et al. |
| 10,741,923 | B2 | 8/2020 | Henry et al. |
| 10,944,177 | B2 | 3/2021 | Henry et al. |
| 11,476,566 | B2 | 10/2022 | Singh et al. |
| 2023/0276781 | A1 * | 9/2023 | Alinger ................ H04N 23/698 348/36 |

OTHER PUBLICATIONS

Mis, Tomasz Aleksander and Modelski, Jozef, In-Flight Electromagnetic Compatibility of Airborne Vertical VLF Antennas, Sensor (2022). Retrieved from the Internet at: https://doi.org/10.3390/s22145302. 28 pages.

"ELF/VLF/LF Radio Propagation and Systems Aspects," AGARD Conference Proceedings 529 (May 1993). 345 pages.

"Tactical Tethered Aerostats for Military Surveillance," Drone Aviation Corp, (2022). Retrieved from the Internet at: https://www.unmannedsystemstechnology.com/company/drone-aviation-corp/. 18 pages.

* cited by examiner

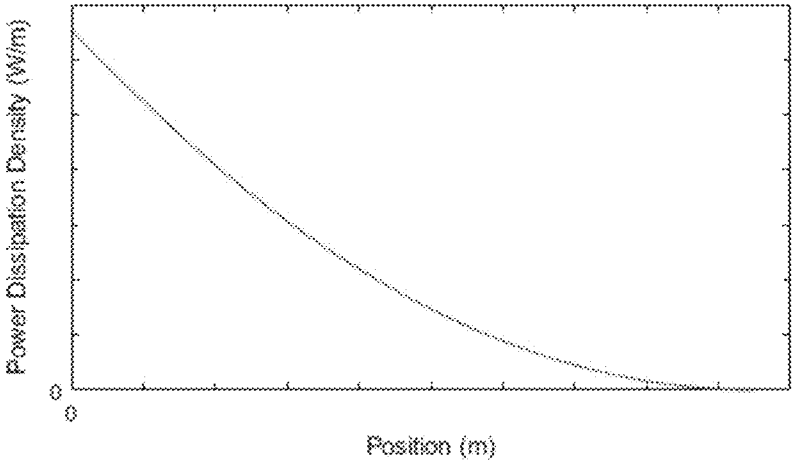
FIG. 3A
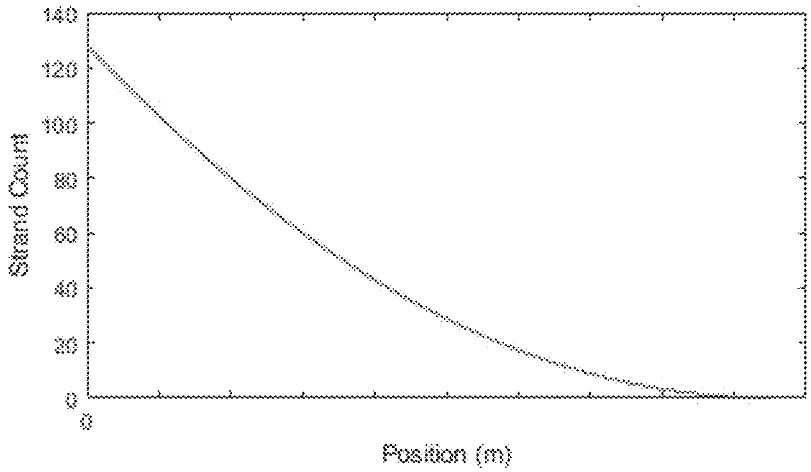
FIG. 3B
| Length (m) start | Length (m) stop | Number wires | Effective cross-sectional area ($mm^2$) | Weight (kg) | Effective AWG |
|---|---|---|---|---|---|
| 0 | 127 | 48 | 6.24 | 7.08 | 9 |
| 127 | 239 | 36 | 4.68 | 4.69 | 10 |
| 239 | 450 | 24 | 3.12 | 5.89 | 12 |
| 450 | 614 | 12 | 1.56 | 2.29 | 15 |
| 614 | 713 | 6 | 0.78 | 0.69 | 18 |
| 713 | 950 | 3 | 0.39 | 0.83 | 20 |
Total weight (kg) 21.46
350
FIG. 3C

INTEGRATED ANTENNA AND TETHER

STATEMENT OF GOVERNMENT INTEREST

This invention was made with United States Government assistance under Contract No. N6523620C8015. The United States Government has certain rights in this invention.

FIELD OF DISCLOSURE

The present disclosure relates to antenna and tether structures.

BACKGROUND

An antenna acts as an interface between electromagnetic signals propagating through space and electric currents propagating in transmit (or receive) circuitry. When transmitting electromagnetic signals, an electric current is applied to the antenna, and the antenna radiates the energy from the current as electromagnetic signals. When receiving radio waves, an antenna receives at least some of the power of an electromagnetic signals, and generates an electric current at its terminals, which is then processed by a receiver. An antenna may be designed to transmit or receive electromagnetic signals at different frequency bands. For example, a low frequency or very low frequency antenna transmits and/or receives electromagnetic signals in the range of less than 300 kHz. There remain a number of nontrivial issues with designing a very low frequency, or a low frequency, or a medium frequency antenna structure.

BRIEF DESCRIPTION OF THE DRAWINGS

FIG. 3A illustrates a graph depicting power dissipation density along a length of wires of an antenna, in accordance with an embodiment of the present disclosure.

FIG. 3B illustrates a graph depicting a variation in wire count along a length of an antenna, in accordance with an embodiment of the present disclosure.

FIG. 3C illustrates a table depicting an example wire count reduction scheme of the antenna structure of FIGS. 1A-2, in accordance with an embodiment of the present disclosure.

Figure 1A:
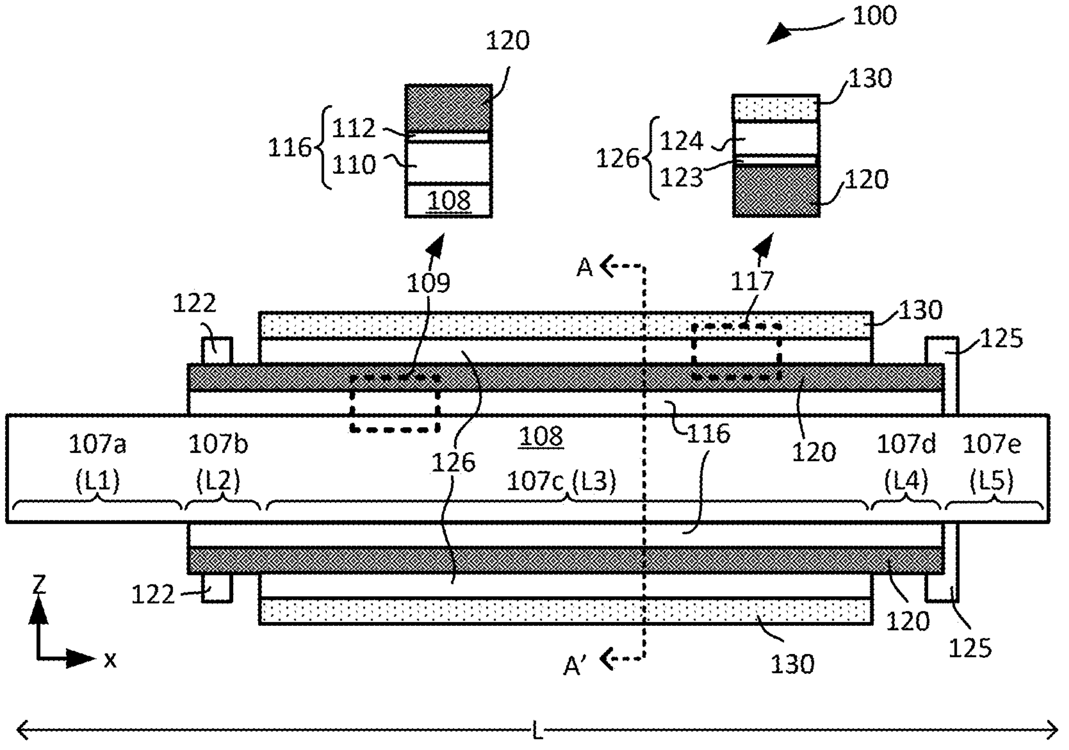
FIGS. 1A, 1B, 1C, and 1D schematically illustrate various views of an antenna structure comprising (i) a core comprising dielectric material, (ii) a first layer comprising a first dielectric material and a first conductive material thereon, the first layer wrapped around at least a section of the core, (iii) a plurality of wires comprising a second conductive material wrapped around at least a section of the first layer, (iv) a second layer comprising a second dielectric material and a second conductive material thereon, the second layer wrapped around at least a section of the plurality of wires, and (v) an outer layer comprising a third dielectric material, the outer layer wrapped around at least a section of the second layer, in accordance with an embodiment of the present disclosure.

Although the following detailed description will proceed with reference being made to illustrative examples, many alternatives, modifications, and variations thereof will be apparent in light of this disclosure.

DETAILED DESCRIPTION

An antenna structure is disclosed. In an example, a wire count of the antenna structure changes along a length of the antenna structure. In such an example, current within conductive wires of the antenna structure decreases as it travels from one end of the wires coupled to a feedline, to an opposing end of the wires coupled to a termination or corona mitigation (or corona reduction) component. Because the current gradually decreases from one end of the wires to the other end of the wires, the number of conductors (wires) used for carrying the current may beneficially also correspondingly decrease from one end of the wires to the other end of the wires. Accordingly, in one embodiment, a wire count of a plurality of wires of the antenna changes (e.g., monotonically decreases) along a length of the antenna. Decreasing the number of wires along the length of the antenna results in a corresponding decrease in weight of the antenna, without adversely impacting the antenna performance. In an example, the antenna is a monopole antenna.

In one embodiment, the antenna comprises a core comprising a dielectric material, where the core is used to support the weight of the antenna and may further be used to tether the antenna to ground structures. A first layer is wrapped around at least a section of the core. The wires are wrapped around the first layer. A second layer is wrapped around the wires. Each of the first layer and the second layer comprises a dielectric material and a conductive material on the dielectric material, where the conductive material of each of the first and second layers is in contact with the wires. In such an embodiment, the conductive materials of the first and second layers facilitate electrical shorting between the wires. In this manner, the conductive materials of the first and second layers are in contact with the wires, and thus helps maintain adequate electrical connection between the wires, despite the discontinuation of some of the wires from one segment to the next. Numerous configurations and variations will be apparent in light of this disclosure.

General Overview

As mentioned herein above, there remain a number of nontrivial issues with designing low and medium frequency antenna structures. In more detail, electromagnetic signals at such frequency ranges have relatively large wave lengths. For example, low frequency signals in the range of 30-300 kHz have wavelengths in the range of about 10-1 km, and very low frequency signals in the range of 3-30 kHz have wavelengths in the range of about 100-10 km. Transmitting or receiving signals at very low, low, or medium frequency necessitates antenna having a relatively large length, such as ranging from a few meters to a few kilometers. However, a large antenna requires a relatively large volume of conductors or wires, which consequently increases a weight of the antenna.

Accordingly, techniques are described herein for an antenna structure that has a varying number of wires along the length of the antenna, wherein the wire count is opportunistically reduced in sections where the current density is relatively less, which in turn decreases the weight of the antenna structure. The techniques described herein can be used for any antenna, and is particularly advantageous for antennas configured for very low, low, or medium frequency applications where the antennas tend to be relatively long and relatively heavy.

In one example embodiment, the antenna comprises a core comprising a dielectric material. In some such cases, one or both the end sections of the core may be used for tethering the antenna to other structures, to mechanically support and hold the antenna in place during an operation or transportation of the antenna. The core, in one example, comprises a flexible and bendable dielectric material, and includes one or more ropes or fibers having relatively high strength, such that the core is able to support the weight of the antenna.

A first layer is wrapped around at least a section of the core (e.g., doesn't wrap around the end sections of the core). The first layer comprises a dielectric material and a conductive material (such as one or more metals and/or alloys thereof) on the dielectric material. The first layer may be in the form of, for example, a film or tape of metallized dielectric material (e.g., metallized polyimide). The first layer has a first side facing the core and an opposing second side, where the conductive material of the first layer is on the second side.

The antenna further comprises a plurality of conductors or wires (also referred to as carriers) comprising a conductive material and wrapped around at least a section of the first layer, such as wrapped around an entirety of the first layer. In one embodiment, the plurality of wires are woven or wound around the first layer, such as braided around the first layer. The plurality of wires are in contact with, and electrically shorted by, corresponding portions of the conductive material of the first layer.

The plurality of wires may be fed electrical signals, for example, by a feedline coupled to the end of the wires. The antenna structure may further include a termination component (such as a corona mitigation or reduction component, e.g., a toroid) coupled to the other end of the wires.

In one embodiment, the current within the plurality of wires decreases from one end of the wires to an opposing end of the wires. Because the current gradually decreases from one end to the other end, the number of wires used for carrying the current may also correspondingly decrease from one end of the wires to the other end of the wires. Accordingly, in one embodiment, a wire count of the plurality of wires changes along a length of the antenna. For example, the plurality of wires are divided in multiple segments along the length of the antenna, with each segment having a corresponding number of wires. A segment closer to the feedline may have, for instance, a greater number of wires than a segment further from the feedline (because the segment closer to the feedline has to carry more current than the segment further from the feedline). In some such examples, as the segments go further apart from the feedline, a corresponding number of wires within the segments decrease monotonically. Decreasing the number of wires along the length of the antenna results in a corresponding decrease in weight of the antenna, without adversely impacting a performance of the antenna.

The antenna structure may further include a second layer wrapped around at least a section of the plurality of wires. Like the first layer, the second layer comprises a dielectric material and a conductive material on the dielectric material, with the conductive material of the second layer facing, and being in contact with the wires. In an example, at a junction between two adjacent segments of the wires, the conductive materials of the first and/or second layers are in contact with wires in both the segments, and thus helps maintain adequate electrical connection between the wires in the two segments, despite the discontinuation of some of the wires from one segment to the next.

The antenna structure may further include a protective jacket or overbraid, for mechanically protecting the antenna and acting as a jacket of the antenna. Numerous configurations and variations will be apparent in light of this disclosure.

It should be readily understood that the meaning of "over" in the present disclosure should be interpreted in the broadest manner such that "over" not only means "directly on" something but also includes the meaning of over something with an intermediate feature or a layer therebetween. As will be appreciated, the use of terms like "above" "below" "beneath" "upper" "lower" "top" and "bottom" are used to facilitate discussion and are not intended to implicate a rigid structure or fixed orientation; rather such terms merely indicate spatial relationships when the structure is in a given orientation.

Architecture

FIGS. 1A, 1B, 1C, and 1D schematically illustrate various views of an antenna structure 100 (also referred to herein as an antenna 100) having (i) a core 108 comprising a dielectric material, (ii) a first layer 116 comprising a first dielectric material 110 and a first conductive material 112 thereon, the first layer 116 wrapped around at least a section of the core 108, (iii) a plurality of wires 120 comprising a second conductive material and wrapped around at least a section of the first layer 116, and (iv) a second layer 126 comprising a second dielectric material 124 and a second conductive material 123 thereon, the second layer 126 wrapped around at least a section of the plurality of wires 120, and (v) an outer layer (e.g., jacket 130) comprising a dielectric material, the outer layer wrapped around at least a section of the second layer 126, in accordance with an embodiment of the present disclosure.

Figure 1B:
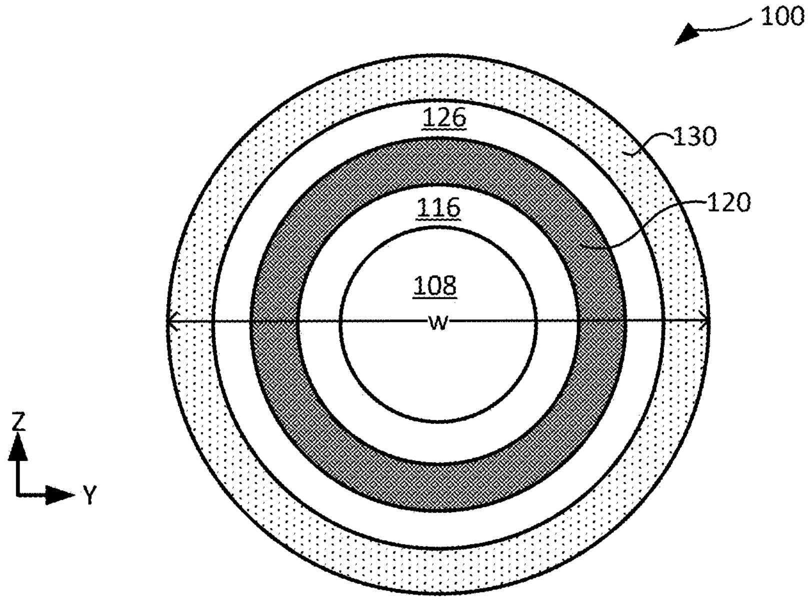
Figure 1C:
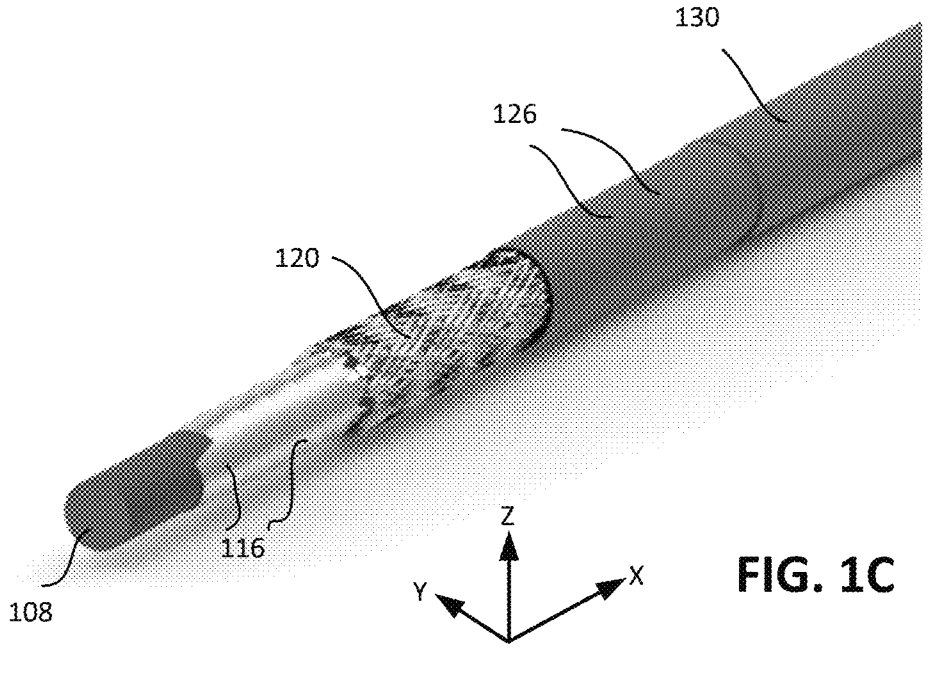
Figure 1D:
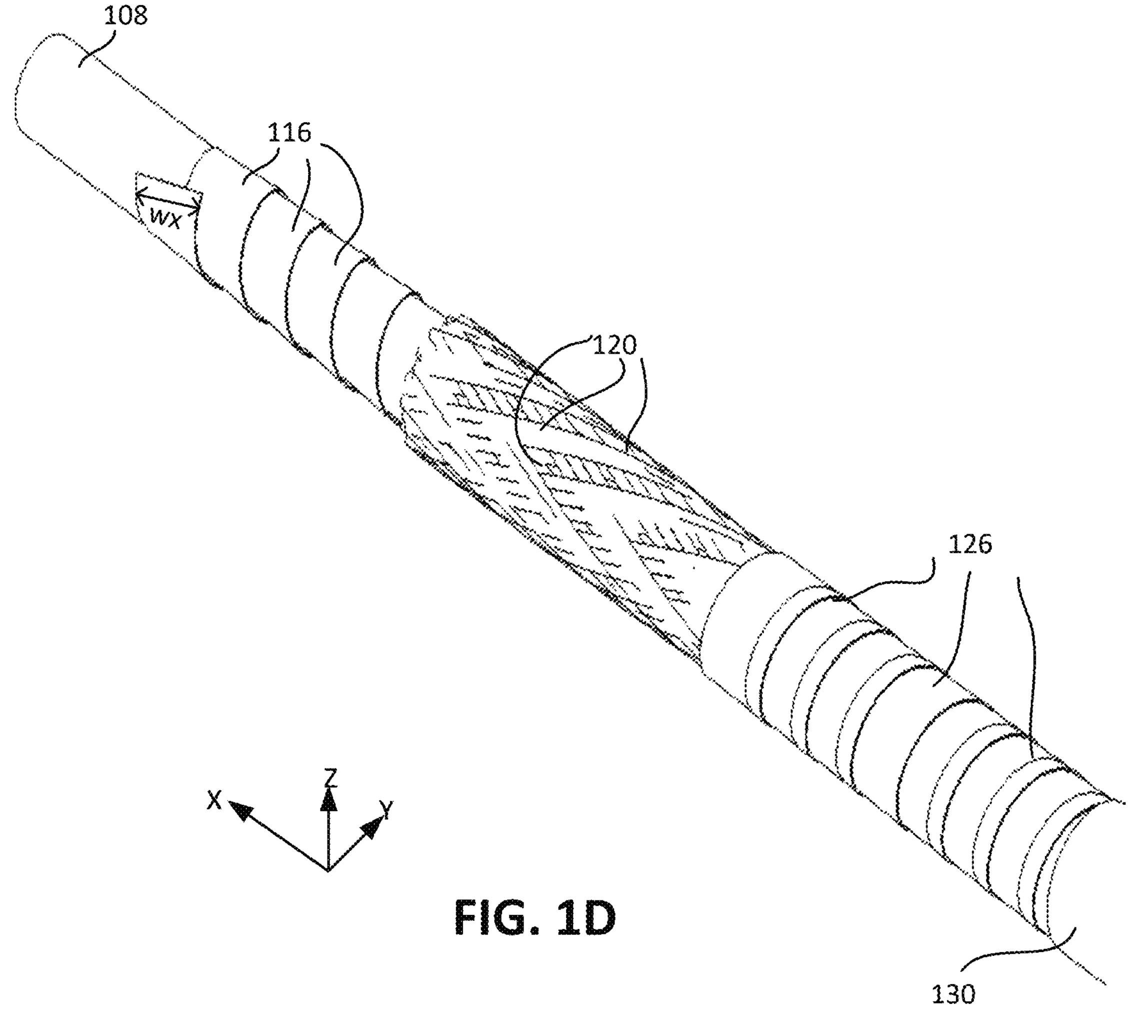

FIG. 1A is a side view of the antenna 100, FIG. 1B is a cross-sectional view (e.g., along line A-A' of FIG. 1A) of the antenna 100, and FIGS. 1C and 1D are perspective views of a section of the antenna 100. Note that in FIGS. 1C and 1D, portions of some of the components are not illustrated, to better illustrate underlying components. For example, a portion of the plurality of wires 120 is not illustrated in FIGS. 1C and 1D, such that the layer 116 below the plurality of wires 120 is visible.

In one embodiment, the antenna 100 may be used for low frequency (LF) and/or very low frequency (VLF) applications, although the antenna 100 can also be used for medium frequency applications as well. For example, the antenna 100 may be configured to transmit signals having frequency of at most 50 Megahertz (MHz), or at most 30 MHz, or at most 10 MHz, or at most 5 MHz, or at most 1 MHz, or at most 800 Kilohertz (KHz), or at most 500 KHz, or at most 300 KHz, or at most 200 KHz, or at most 100 KHz, for example. The antenna 100, in one example, may be used for transmission of low or very frequency signals (where the frequency range is described above), and may, in one example, be used to broadcast such signals. In an example, the antenna is a monopole antenna.

An antenna for transmission of signals at such a relatively low frequency range necessitates a relatively long span, as is the case with the antenna 100. For example, a length L of the antenna 100, as labelled in FIG. 1A, may range from a few meters to tens of meters, or hundreds of meters, or even a few kilometers (km), e.g., based on a frequency of the signal transmitted. In an example, the length L may range between 20 meters to 3 kms, and may vary from one example to the next.

Because of the high length of the antenna 100 as described above, the antenna 100 has a weight from a few kilograms to tens or even hundreds of kilograms, e.g., based on a frequency of the signal transmitted, and resultant length of the antenna 100. For example, based on a frequency of the signal transmitted and a length of the antenna 100, the weight of the antenna 100 may range between 10 kgs to 200 kgs. A portion of the weight of the antenna 100 is contributed by the plurality of wires 120. As described below, due to a tapering or variation of a wire count of the plurality of wires 120 along a length of the antenna 100, the weight of the antenna 100 may be reduced.

In one embodiment, the antenna 100 comprises a core 108 comprising a dielectric material. Various sections of the core 108 are labelled as 107*a*, 107*b*, 107*c*, 107*d*, and 107*e* in FIG. 1A. A first end section 107*a* and a second end section 107*e* of the core 108 do not have the layers 116, 126, the plurality of wires 120, or a jacket 130 wrapped around the core 108.

In one embodiment, the end sections 107*a* and/or 107*e* of the core 108 are used for tethering the antenna 100 to a structure (e.g., see FIG. 3 described below). For example, each of the end sections 107*a* and/or 107*e* may be tethered to corresponding structures. In an example, the end section 107*a* may be tethered to a ground structure and the end section 107 may be tethered to an airborne device, as described below with respect to FIG. 4B. In an example, when transporting the antenna 100 from one location to another, attachments may be attached to the end sections 107*a* and/or 107*e*, and the antenna 100 may be carried and transported while the end sections 107*a* and/or 107*e* are attached to the attachments for transportation. In an example, the core 108 is also referred to as a strength member or a tether member of the antenna 100.

In one example and as also described below with respect to FIG. 4B, the antenna 100 is an integrated antenna and tether that is deployed via an airborne device such as an aerostat, balloon, dirigible or drone. The integrated antenna and tether would be deployed over a relatively long distance and provide a means to transmit signals including high power VLF/LF transmissions. The design of the integrated antenna and tether also serves to mitigate effects from atmospheric electricity such as lightning and corona. The risk of an airborne device being impacted by atmospheric electricity relates to the electrical field around the structure. A properly constructed tether helps to mitigate the effects from the electrics fields and corona by dissipating the current across the length of the tether.

A length of the end section 107*a* is L1, and a length of the end section 107*e* is L5. In an example, the lengths L1 and L5 are made sufficiently long, so as to allow the antenna 100 to be tethered using the core 108. Merely as an example, the length L is 200 m, and the lengths L1 and L5 are 90 m and 9 m, respectively. In an example, the lengths L1 and L5 may be based on the tethering arrangement used, and may vary from one example to the next.

The core 108, in one example, comprises a flexible and bendable dielectric material. For example, the core 108 comprises one or more ropes or fibers having relatively high strength, such that the core 108 is able to support the above described weight of the antenna 100. In one example, the antenna tether is coupled to an airborne device and the core has sufficient strength to retain the airborne device in place with the elevated airborne device. In an example, the core 100 comprises ultra-high-molecular-weight polyethylene (UHMWPE) arranged in a rope of fiber form. UHMWPE is available commercially as, for example, Dyneema® sold by Avient®, or as Spectra® sold by Honeywell Corporation®. In another example, the core 100 comprises aromatic polyamide (aramid), which are a class of heat-resistant and strong synthetic fibers, and which are available commercially as kevlar® or technora®. In another example, the core 100 comprises liquid crystalline polymer, which is available commercially as Vectran®. In yet another example, the core 100 comprises poly (p-phenylene-2,6-benzobisoxazole) synthetic polymer, which is available commercially as Zylon™.

The layer 116 is wrapped around the sections 107*b*, 107*c*, and 107*d* of the core 108. The layer 116 comprises a dielectric material 110 and a conductive material 112 thereon, as illustrated in an expanded view 109 of a section of the layer 116. In an example, the conductive material 112 comprises one or more metals and/or alloys thereof. Examples of the conductive material 112 comprises aluminum, copper, nickel, or another metal. The dielectric material 110 is in the form of a film or tape of dielectric material. In an example, the dielectric material 110 comprises a polymer, such as a polyimide film, e.g., Kapton® tape.

When forming the layer 116 in some examples, the conductive material 112 is deposited on the film or tape of dielectric material 110. For instance, the conductive material 112 can be sputtered or otherwise deposited (e.g., in a vacuum chamber, although other process environment and/or deposition techniques may also be used) on the film of dielectric material 110, to form the layer 116. Because of the presence of the conductive material 112 comprising one or more metals and/or alloys thereof on the film of dielectric material 110, the layer 116 is also referred to as a "metallized dielectric material film" or "metallized layer of dielectric material," such as "metallized polyimide" (e.g., Kapton® tape that is metallized on one side).

In some examples, the layer 116 has a form of metallized tape, and is wrapped around the core 108, as illustrated in FIG. 1D. For example, a width of the tape-based layer 116 is wx, see FIG. 1D, where wx is substantially smaller than a length of the layer 116. The tape-based layer 116 is wrapped in turns around the core 108, such that each turn at least in part overlaps with an immediate prior turn of the layer 116, see FIG. 1D. As will be appreciated in such examples, the length of the layer 116 in an unwrapped condition is much longer than an effective length Lw (see FIG. 2) of the layer 116. In other examples, layer 116 can be a single continuous metallized layer or film that is deposited onto core 108, rather than a tape-based layer.

Note that as illustrated in FIG. 1A in the magnified view 109, the dielectric material 110 has a first side facing the core 108 and an opposing second side facing the plurality of wires 120. The conductive material 112 is deposited on the second side facing the plurality of wires 120, such that portions of the conductive material 112 is in contact with (such as in electrical contact with) one or more of the plurality of wires 120.

The antenna 100 comprises the plurality of wires 120 comprising a conductive material wrapped around at least a section of the layer 116. In one example and as illustrated in FIG. 1A, the plurality of wires 120 are wrapped around the sections 107*b*, 107*c*, and 107*d* of the core 108, e.g., similar to the layer 116. Thus, in such an example, the plurality of wires 120 wrap around an entirety of the layer 116. In another example, at least some sections of the layer 116 may not be wrapped around by the plurality of wires 120.

Individual wires of the plurality of wires 120 comprises conductive material such as copper, aluminum, or one or more other conductive metals and/or alloys thereof. The diameter or gauge of the wires 120 may be based on a desired current carrying capacity of the wires 120, and may vary from one example to the next. In one example, copper wires with a diameter in the range of 16-36 American Wire Gauge (AWG) may be used, such as in the subrange of 16-30 AWG, or 16-26 AWG, or 20-36 AWG, or 20-30 AWG. In another example, aluminum wires with a diameter in the range of 22-42 AWG may be used, such as in the subrange of 22-36 AWG, or 22-32 AWG, or 30-42 AWG, or 30-36 AWG.

In one embodiment, the plurality of wires 120 are woven or wound around the layer 116, such as braided around the layer 116. In such an example, the plurality of wires 120 are braided around the layer 116 using a braiding machine. FIGS. 1C and 1D illustrate the braided or woven form of the plurality of wires 120.

The plurality of wires 120 are fed electrical signals by an appropriate feedline 122. The feedline 122 is schematically illustrated using two boxes, although the feedline 122 may have another appropriate shape.

In an example, the feedline 122 is coupled to a bare section of the plurality of wires 120, e.g., a section of the plurality of wires 120 not covered by the layer 126 or the jacket 130. A section of the core 108, around which the feedline 122 is coupled to the wires 120, is labelled as 107*b* in FIG. 1. Thus, along a length of the section 107*b*, the layer 116 and the wires 120 are wrapped around the core 120, without the layer 126 or the jacket 130 around the wires 120. In an example, the section 107*b* has a length L2, which may range between 0.1 m to 1 m, such as in a subrange of 0.2 m to 0.4 m, e.g., enough to couple the feedline 122 to the wires 120.

In one example for operating the antenna 100, the feedline 122 feeds the plurality of wires 120 with an electrical signal having a frequency that has been described above, e.g., for transmission or broadcast by the antenna 100. The voltage level of the electrical signal fed by the feedline 122 to the plurality of wires 120 may vary from one example to the next, and in an example, may range between 10 kilovolts (kV) to 100 kV. In one example there is a ground platform with a winch that deploys the integrated antenna and tether via an airborne device. The ground platform includes a transmitter that is electrically coupled to the integrated antenna and tether to transmit signals along the antenna.

In one embodiment, the antenna 100 comprises a termination component 125 to terminate the plurality of wires 120. For example, the wires carry a voltage in the range of kilovolts. Without proper termination, the antenna 100 may experience corona effect. Accordingly, the termination component 125 also acts as a corona mitigation device. In an example, a corona ring may be used. A corona ring may be in the form of a toroid of conductive material (such as one or more metals and/or alloys thereof), which distributes the electric field gradient, and lowers a maximum value of the electric field gradient below the corona threshold, thereby preventing or at least mitigating a corona discharge. Other corona mitigation or reduction devices may also be used, in an example.

Figure 2:
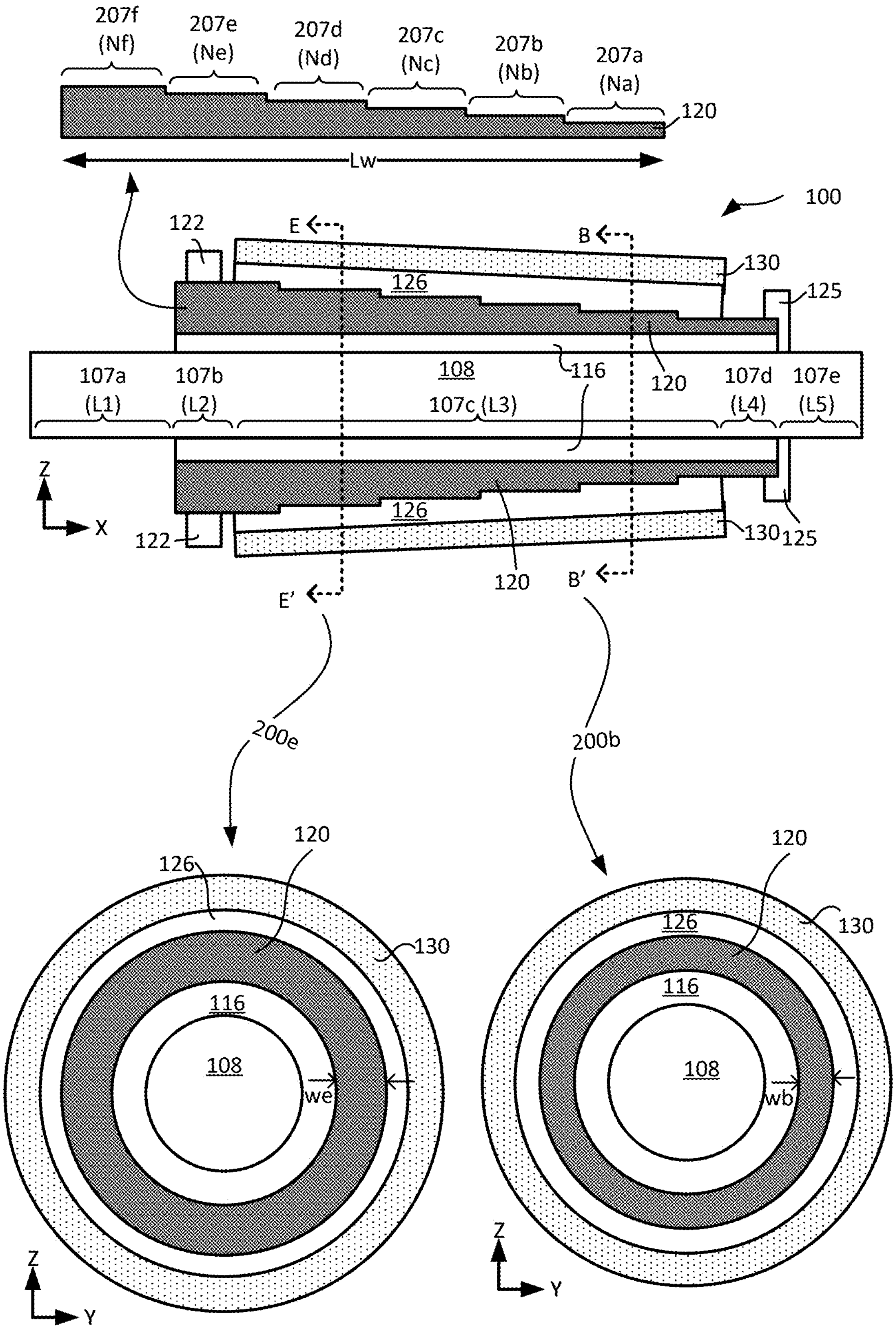
FIG. 2 illustrates the antenna structure of FIGS. 1A-1D, and further illustrates a change in a wire count of the plurality of wires of the antenna structure along a length of the antenna structure, in accordance with an embodiment of the present disclosure.

In one embodiment, a wire count of the plurality of wires 120 changes along a length of the antenna 100, referred to as wire tapering. FIG. 2 illustrates the antenna structure 100 of FIGS. 1A-1D, and further illustrates a change in a wire count of the plurality of wires 120 along a length of the antenna structure 100, in accordance with an embodiment of the present disclosure. The top section of FIG. 2 illustrates two side views of the antenna structure 100 (and depicts the tapering of wires 120 in further detail), and the bottom section of FIG. 2 illustrates two cross-sectional views of the antenna structure 100. As will be appreciated in light of this disclosure, a width of the plurality of wires 120, as well as changes in the width, are shown in an exaggerated and block-like manner relative to one or more other components of the antenna 100, for ease of illustration; actual implementations may have less abrupt transitions and/or a more subtle change in width from one antenna section to the next. In another example, there may not be any change in width, and thus no width tapering, and any change in wire count (e.g., wire count tapering) may be achieved by changing a density with which the wires are wrapped or braided around the core (e.g., wires in segment 207*f* may be braided more densely than wires in segment 207*a*).

In one embodiment, a wire count of the plurality of wires 120 changes along the length of the antenna 100. For example, in FIG. 2, the plurality of wires 120 are divided in multiple segments along the length of the antenna 100, such as segments 207*a*, . . . , 207*f*. An expanded view of the plurality of wires 120, including the segments 207*a*, . . . , 207*f*, are illustrated in a top portion of FIG. 2. Although six segments are illustrated in FIG. 2, the plurality of wires 120 may be segmented in a lower (such as five or lower) or a higher (such as seven or higher) number of such segments.

Each segment 207 of the plurality of wires 120 has a corresponding number of wires. For example, segment 207*a* has Na number of wires braided around the layer 116, segment 207*b* has Nb number of wires braided around the layer 116, segment 207*f* has Nf number of wires braided around the layer 116, and so on, as illustrated in FIG. 2.

As illustrated in FIG. 2, the segment 207*f* of the wires 120 is closer to the feedline 122 than the segments 207*a*, . . . , 207*e*; the segment 207*e* of the wires 120 is closer to the feedline 122 than the segments 207*a*,. . . , 207*d*; the segment 207*d* of the wires 120 is closer to the feedline 122 than the segments 207*a*, . . . , 207*c*; and so on. Thus, segment 207*f* is closest to the feedline 122, the segment 207*e* is next closest to the feedline 122, segment 207*d* is next closest to the feedline 122, and so on, as illustrated in FIG. 2.

In one embodiment, the current within the wires decreases from one end of the plurality of wires 120 to an opposing end of the plurality of wires 120. For example, current within the wires 120 at or near the feedline 122 (e.g., within the segment 207*f*) is relatively high (e.g., maximum among all the segments 207*a*, . . . , 207*f*). On the other hand, current at or near the termination component 125 (e.g., within the segment 207*a*) is relatively low (e.g., minimum among all the segments 207*a*, . . . , 207*f*).

Because the current gradually decreases from one end of the plurality of wires 120 to the other end of the plurality of wires 120, a number of conductors used for carrying the current also correspondingly decreases from one end of the plurality of wires 120 to the other end of the plurality of wires 120.

Accordingly, the number of conductors or wires Nf within the segment 207*f* is higher than the number of conductors or wires Ne within the segment 207*e*. Similarly, the number of wires Ne within the segment 207*e* is higher than the number of wires Nd within the segment 207*d*; the number of wires Nd within the segment 207*d* is higher than the number of wires Nc within the segment 207*c*; the number of wires Nc within the segment 207*c* is higher than the number of wires Nb within the segment 207*b*; and the number of wires Nb within the segment 207*b* is higher than the number of wires Na within the segment 207*a*. Thus, Nf>Ne>Nd . . . >Na.

In an example, Nf is greater than Na by at least 25%, or at least 40%, or at least 50%, or at least 75%, or at least 85%, or at least 90%. Thus, for example, the number of wires included in the plurality of wires 120 progressively decreases along a length of the core 108, such that the number of wires included in the plurality of wires closest to a first end of the plurality of wires (e.g., an end closer to the feedline 122) is at least 25%, or at least 40%, or at least 50%, or at least 75%, or at least 85%, or at least 90% greater than the number of wires closest to a second end of the plurality of wires 120 (e.g., an end closer to the termination component 125).

This is schematically illustrated using the stepped segments 207*a*, . . . , 207*f*. For example, as illustrated in the side view of the top portion of the antenna 100, a thickness or width of the segment 207*f* is greater than a thickness width of the segment 207*e*, as more wires are in the segment 207*f* than that in segment 207*e*; a width of the segment 207*e* is greater than a width of the segment 207*d*, and so on.

For example, illustrated in FIG. 2 is a cross-sectional view 200*e* of the antenna 100 along the line E-E' passing through the segment 207*e*, and another cross-sectional view 200*b* of the antenna 100 along the line B-B' passing through the segment 207*b*. In the cross-sectional view 200*e*, the plurality of wires 120 has a thickness or width of we. In the cross-sectional view 200*b*, the plurality of wires 120 has a thickness or width of wb. As illustrated in FIG. 2 and as described above, we is higher than wb.

The plurality of wires a length Lw (see FIG. 2), which is a sum of lengths L2, L3, and L4 of FIG. 1. Merely as an example, assume Lw is 100 m. Also merely as an example, a length of the segment 207*f* is 13 m and Nf is 48; a length of the segment 207*e* is 16 m and Ne is 36; a length of the segment 207*d* is 20 m and Nd is 24; a length of the segment 207*c* is 14 m and Nc is 12; a length of the segment 207*b* is 12 m and Nb is 6; and a length of the segment 207*a* is 25 m and Na is 3. Thus, the count Nf, . . . , Na monotonically decreases from segment 207*f* to segment 207*a*.

In such an example, 48 number of wires within the segment 207*f* are wrapped or braided around the layer 116; 36 number of wires within the segment 207*e* are wrapped or braided around the layer 116; 24 number of wires within the segment 207*d* are wrapped or braided around the layer 116; and so on.

Thus, in the above described example, during braiding or weaving of the wires 120 over the layer 116, the braiding process starts with 48 wires initially, to weave the segment 207*f* having corresponding Nf of 48. Once the segment 207*f* has been formed, 12 of the 48 wires are discontinued, and the braiding process continues with the remaining 36 wires to form the segment 207*e* having corresponding Ne of 36. Similarly, once the segment 207*e* has been formed, 12 of the 36 wires of the segment 207*e* are discontinued, and the braiding process continues with the remaining 24 wires to form the segment 207*d* having corresponding Nd of 24. This process continues, until all the segments 207*f*, . . . , 207*a* have been formed.

The number of segments 207, a length of each segment 207, and/or a number of wires within each segment may be based on a current distribution within the wires of each segment, as well as current carrying capacity of individual wires (which may in turn be based on a conductive material of the wires 120 and/or a diameter of the wires). The length of individual segments 207 and/or a number of wires within each segment may vary from one example to the next.

Decreasing the number of wires 120 along the length of the antenna 100 results in a corresponding decrease in weight of the antenna 100, without adversely impacting a performance of the antenna 100. For example, as described above, the current of the antenna 100 decreases anyway along the length of the antenna 100, as described above. Accordingly, decreasing the number of wires 120 from one end to the other doesn't impact current carrying capability of the antenna 100, while decreasing a weight of the antenna 100.

Thus, due to the decrease in the number of wires 120 along the length of the antenna 100, the wires 120 are tapered, with a higher width or thickness at or near the feedline 122, and a lower width or thickness at or near the termination component 125. In an example, the outer layer 126 and the jacket 130 of the antenna 100 may also taper correspondingly, as illustrated in FIG. 2.

The layer 126 is wrapped around at least a section of the plurality of wires 120, e.g., wrapped around the section 107*c* of the core 108. Thus, the layer 126 does not wrap around at least a first end of the plurality of wires 120 at or near the segment 207*f*, e.g., where the feedline 122 is mechanically attached to the plurality of wires 120. Similarly, the layer 126 also does not wrap around at least a second end of the plurality of wires 120 at or near the segment 207*a*, e.g., where the termination component 125 is mechanically attached to the plurality of wires 120.

Referring again to FIGS. 1A-1D, the layer 126 comprises a dielectric material 124 and a conductive material 123 thereon, as illustrated in an expanded view 117 of a section of the layer 126. In an example, the conductive material 123 comprises one or more metals and/or alloys thereof. Examples of the conductive material 123 comprises aluminum, copper, nickel, or another metal. The dielectric material 124 is in the form of a film or tape of dielectric material. In an example, the dielectric material 124 comprises a polymer, such as a polyimide film, e.g., Kapton® tape.

The conductive material 123 is deposited on the film of dielectric material 124, to form the layer 126. In an example, the conductive material 123 is sputtered or otherwise deposited (e.g., in a vacuum chamber, although other process environment and/or deposition techniques may also be used) on the film of dielectric material 124, to form the layer 126. Because of the presence of the conductive material 123 comprising one or more metals and/or alloys thereof on the film of dielectric material 124, the layer 126 is also referred to as a metallized film or metallized layer of dielectric material, such as metallized polyimide. The layer 126 has a form of a film or tape, and is wrapped around the plurality of wires 120, as illustrated in FIG. 1D, such that each turn of the wrap at least in part overlaps with an immediate prior turn.

Note that as illustrated in the magnified view 117, the dielectric material 124 has a first side facing the plurality of wires 120 and an opposing second side facing the jacket 130. The conductive material 123 is deposited on the first side facing the plurality of wires 120, such that the conductive material 123 is in contact with (such as in electrical contact with) one or more of the plurality of wires 120.

In one embodiment, the conductive material 112 of the layer 116 and/or the conductive material 123 of the layer 126 are in contact with the plurality of wires 120. The conductive materials 112, 123 facilitate in electrical contact between the wires 120. For example, in a junction or location between two adjacent segments 207 of the plurality of wires 120 (such as a junction or location between segments 207*e* and 207*d*), at least some of the wires are discontinued or are terminated. However, the conductive materials 112, 123 are in contact with wires in both the segments 207*e* and 207*d*, and helps maintain adequate electrical connection between the wires in the two segments 207*e* and 207*d*, in spite of the discontinuation of some of the wires from segment 207*e* to segment 207*d*.

Note that in FIGS. 1A-2 there are two forms of such conductive materials, such as conductive material 112 of the layer 116, and conductive material 123 of the layer 126. However, in another example, only of the conductive materials 112 or 123 may be present in the antenna 100.

In one embodiment, the antenna 110 further comprises a protective jacket or overbraid 130, for mechanically protecting the antenna 100 and acting as a jacket of the antenna 100. The jacket 100 comprises a dielectric material, such as a polyether ether ketone (PEEK), cross-linked polyolefin, polyester, CoPolymer, fluorinated ethylene propylene (FEP), or another jacketing material.

The wire count of the wires 120, including the tapering or variation in the count of the wires 120 along a length of the antenna 100, can be derived empirically or theoretically using appropriate calculations. In an example, static charge on a conductor distributes itself uniformly along the conductor's surface, e.g., due to the mutual repulsion between charge carriers. An electrically short antenna is defined as the $L \ll \lambda = 2\pi c/\omega$, where L is a length of the antenna, and λ is the wavelength of transmitted signals. In an example, a frequency of signals transmitted is 30 kHz, and the wavelength is λ=10 km. An antenna for this example frequency of 30 kHz may have a length L in the range of 1-2 km, such as 1.25 km. Other examples may be configured for different frequencies and have different lengths.

Current injected into one end of wires of an antenna changes at each increment of length as it goes, so the charge flow remaining at each point along the wire is given by:

$$I(x) = I_0 - \int_0^x \frac{I_0}{L}\,dx = I_0\left(1 - \frac{x}{L}\right), \qquad \text{Equation 1}$$

where L is the length of the wires, $I_0$ is the initial current at or near the feedline, and I(x) is the current within the wires at distance x from the feedline. Thus, equation 1 can be used to determine the current distribution along the length of the wires. Note that equation 1 holds for an example where the wire count is tapered, and is also applicable for a case where the wire count is not tapered and a same cross-sectional area of the wire is used throughout the antenna.

In an example, for a general wire conducting current (e.g., without any tapering of the wire count), there is resistance to flow of current within the wire, which results in power dissipation and consequent loss of efficiency. For example, for a wire with resistance R, the power dissipated is:

$$P = I^2 R, \qquad \text{Equation 2}$$

where R is the resistance of an entirety of the wire, and I is the average current flowing within the wire. Assuming that $\dot{R}$ is the resistance per unit length of the wire, and L is the length, then:

$$R = L\dot{R}. \qquad \text{Equation 3}$$

Furthermore, assume that a resistivity of the material of the wire is $\ddot{R}$ (having a unit of Ω·m), and A is the cross-sectional area of the wire. In such a case:

$$\dot{R} = \frac{\ddot{R}}{A}. \qquad \text{Equation 4}$$

For example, resistivity $\ddot{R}$ of copper is $1.724\times10^{-8}$ Ω·m, and cross section A of a 10 g (gauge) copper wire is $5.2621\times10^{-6}$ $mm^2$. Thus, from equation 4, the resistance $\dot{R}$ per unit length of the 10 g copper wire is $\dot{R}$=0.0032762$^{\Omega}$/m.

The resistance R of 10 g copper wire, with a length of about 950 m, can be calculated from equation 3 as $$R = 950\,\frac{1.724\times10^{-8}}{5.2621\times10^{-6}} = 3.113\ \Omega.$$

Assuming a current I of 100 A, from equation 2, the power dissipation is given as:

$$P = 31.13\ \text{kW at 100 A, or 32.77 W/m.} \qquad \text{Equation 5}$$

Thus, power dissipated per unit length $\dot{P}$ is 32.77 W/m, whereas the total power dissipation P is 31.13 kW. Note that such calculations assume no tapering of the wire and a substantially same cross-section of the wire along its entire length (e.g., 10 g wire).

Now assuming the actual current distribution $$I(x) = I_0\left(1 - \frac{x}{L}\right)$$

from equation 1, for as 10 g (gauge) copper wire, the power dissipation is given by:

$$\dot{P}(x) = \dot{R}I_0^2\left(1 - \frac{x}{L}\right)^2 = 32.763\left(1 - 0.002105x + 1.108\times10^{-6}x^2\right). \qquad \text{Equation 6}$$

Note that $\dot{P}$(x) represents power dissipation over unit length. FIG. 3A illustrates a graph 300 depicting power dissipation density (power dissipation per unit length) along a length of the wires of an antenna, in accordance with an embodiment of the present disclosure. The X axis represents position (x) in meters, where a position of 0 is at a feedline, and as the position increases, the distance from the feedline increases. The Y axis represents the power dissipation per unit length (with a unit of W/m). Note that in FIG. 3A, a constant wire count with no tapering and a 10 g copper wire is assumed. As seen from equation 6 and the graph 300 of FIG. 3A, the maximum power dissipation occurs at points where position x is at or near the feedline (such as at position zero or near zero). Note that this reduction in power dissipation is not due to tapering of wire count, but due to the fact that a point further from the feedline carries less current, and hence, dissipates less power. As position x gets higher, the power dissipation decreases due to the decrease in the current conduction, with the power dissipation being the least (e.g., about zero) when x is equal to L, at an end of the antenna that is opposite to an end having the feedline.

The total power dissipation P over the entire length of a 10 g wire (without any wire count tapering), assuming a length L of 1000 m, is given as:

$$P = \int_0^L \dot{P}(x)dx = 32.763\left(L - 0.002105\frac{L^2}{2} + 1.108 \times 10^{-6}\frac{L^3}{3}\right) = 10.379\ \text{kW}. \quad \text{Equation 7}$$

Note that in equation 7, the power dissipated P is a peak power dissipation. A root mean square (rms) power dissipation may have half of the peak power dissipation.

The following description refers to a wire gauge of 10 g, although wires having other cross-sectional areas may also be used. A 10 g wire has a diameter of 2.5882 mm. In an example, an alternating current does not travel evenly throughout the conducting material, due to the effect of magnetic flux. In such an example, this may force the current outward toward the surface of the conductor, also referred to as skin effect. The current density falls off exponentially from the surface to the core of the conductor. The electric current flows mainly at the skin of the conductor, between the outer surface and a level called the skin depth. The skin depth depends on the frequency of the current. As frequency increases, current flow becomes more concentrated near the surface, resulting in less skin depth. In an example, the skin depth is the 1σ point of the current density. For example, for a copper conductor, the skin depth at 30 kHz is at 0.382 mm, the skin depth at 20 kHz is at 0.467 mm, the skin depth at 10 kHz is at 0.661 mm.

Thus, wires with diameters larger than this begin to exhibit significant loss of effective cross section area, where the effective cross section area is the cross section area actually carrying the current, because the skin effect prohibits the entire cross-section of the conductor from carrying current, thereby effectively wasting inner sections of the conductor that do not contribute to current conduction. Accordingly, for example, for a 30 kHz system, there is less benefit to using a conductor having cross-sectional area larger than about 26 g wire. Similarly, for 20 kHz, an optimal or near optimal conductor size may be about 25 g; and for 10 kHz, an optimal or near optimal conductor size may be about 10 g. In an example, in a multi-wire cable, the wires may be arranged in a single layer around the circumference of a center supporting member to limit the proximity effect, which forces current to the surface of a cable bundle.

In an example, for a constant or near constant power dissipation, the following holds:

$$\text{Set } \dot{R}(x) = \frac{\dot{R}_0}{\left(1 - \frac{x}{L}\right)^2},\ \text{so } \dot{P}(x) = \dot{R}_0 I_0^2,\ \text{and } P = L\dot{R}_0 I_0^2. \quad \text{Equation 8}$$

Herein, $\dot{R}(x)$ is the resistance per unit length of the wires 120, and is a function of the distance x from the feedline. As described above, the current conduction falls along the length of the wires, and hence, the power dissipation $\dot{P}(x)$ is also a function of the distance x from the feedline.

Note that the above example described with respect to equation 7 had a total power dissipation P of 10.379 kW for a 1000 m length 10 g copper wire, without any wire tapering. Setting this total power dissipation P of 10.379 kW as a target value to be achieved, the value of $\dot{R}_0$ can be calculated from equation 8 as:

$$\dot{R}_0 = 0.001093\ \frac{\Omega}{\text{m}}. \quad \text{Equation 9}$$

From equations 4 and 9, the cross-sectional area of the wires 120 can be determined as:

$$A = \frac{1.724 \times 10^{-8}\ \Omega \cdot \text{m}}{0.001093\ \frac{\Omega}{\text{m}}} = 15.78\ \text{mm}^2. \quad \text{Equation 10}$$

Assuming 26 g wires to be used for the antenna 100, this translates to about 128 strands initially (e.g., at or near the feedline 122), where the 128 strands of the wires 120 at or near the feedline 122 provides an outer diameter of 17 mm. The number of strands of wires at various other segments or points along a length of the antenna 100 may be similarly calculated, using equations 8-10, along with locations of the junction points between the segments.

In an example, individual strands of the wires may be arranged in a single layer around the core 108. FIG. 3B illustrates a graph 320 depicting a count of strands of the wires 120 of the antenna along a length of the antenna 100, in accordance with an embodiment of the present disclosure. The X axis represents position (x) in meters, where a position of 0 is at the feedline 122, and as the position increases, the distance from the feedline 122 increases. The Y axis represents the strand count of the wires 120. As seen from the graph 320 of FIG. 3B and as also described above, the wire count is maximum at or near the feedline 122, and the wire count decreases as position x gets higher and the distance from the feedline 122 increases.

Note that in this example graph 310, the wire count is decremented in a relatively fine decrement, such as decremented by one. In practice, the wire count may be decremented at junctions of two adjacent segments by a higher decrement amount (such as from 48 wires to 36 wires), and hence, the graph 320 for such an example would have stepped decrements of wire counts.

In an example, the wires 120 are arranged in a single layer around at least a section of the core 116, e.g., so as to avoid the proximity effect. When a wire is terminated at a junction point between two adjacent segments, adjacent wires may lose contact with the terminated wire. Accordingly, as described above, the conductive materials 112 and/or 123 facilitate in maintaining electrical transmission between a terminated wire and a non-terminated wire, e.g., by being in direct contact with both the terminated wire and the non-terminated wire, thereby providing a conductive path between the terminated wire and the non-terminated wire. In an example, due to the above described skin effect, the current is transmitted through the wires 122, as well as the conductive materials 112 and/or 123. The conductive materials 112 and/or 123 distribute current from a terminated wire to a non-terminated wire, thereby avoiding charge buildup at the termination points of the wires, and thereby suppressing or at least reducing corona effects at the junctions between adjacent segments.

Note that the above example described with respect to equation 7 had a total power dissipation P of 10.379 kW for a 1000 m length 10 g copper wire (with any wire count tapering). This total power dissipation value P of 10.379 kW for a 1000 m length 10 g copper wire was used as a reference for subsequent equations 8, 9, and 10, and to calculate example number of wires and the variation of the wires. However, this specific power value for a 10 g wire need not be used as a reference value, and any other appropriate target power dissipation values may also be used. For example, when some level of cooling arrangement is available (such as air cooling, or deployment in cooler temperature), a higher reference power dissipation value may also be used.

In an example, an increase in drive voltage due to series resistance of the wires 120 is given by:

$$\dot{V}(x) = \dot{R}I_0\left(1 - \frac{x}{L}\right), \quad \text{Equation 11}$$

where $\dot{V}(x)$ is the voltage drop due to resistance, measured per unit length along the length of the antenna 100. A total voltage drop is given by:

$$V = \int_0^L \dot{V}(x)dx = \dot{R}I_0\frac{L}{2}. \quad \text{Equation 12}$$

For a 10 g copper wire (whose resistance/unit length $\dot{R}$ has been described above) and assuming a length L of 1000 m, the total voltage drop in the wires may be calculated as:

$$V = \int_0^L \dot{V}(x)dx = \dot{R}I_0\frac{L}{2} = 155.6 \text{ V}. \quad \text{Equation 13}$$

For a constant power dissipation design:

$$\dot{R}(x) = \frac{\dot{R}_0}{\left(1 - \frac{x}{L}\right)^2}, \quad \text{Equation 14}$$

$$V = \int_0^{L-d} I_0\frac{\dot{R}_0}{\left(1 - \frac{x}{L}\right)}dx + \int_{L-d}^{L} I_0\frac{\dot{R}_0}{\left(1 - \frac{L-d}{L}\right)}dx.$$

Note that theoretically this may be infinity (∞) if the wire count goes to zero at the tip of the antenna opposite the feedline 122. However, a practical design where terminations stop d meters from the tip yields the following:

$$V = ((\log(L) - \log(d)) + 1)LI_0\dot{R}_0 = 743.3 \text{ V}, L = 950, d = 237 \quad \text{Equation 15}$$

FIG. 3C illustrates a table 350 depicting an example wire reduction scheme of the antenna 100 of FIGS. 1A-2, in accordance with an embodiment of the present disclosure. In this example, there are 6 segments 207*a*, . . . , 207*f*. In the example table 350, 26 g copper wires are used. Table 350 has 6 columns. The first column indicates (in m) location of a start of a segment (where location 0 is at the feedline 122). The second column indicates (in m) location of a stop of a segment (where location 0 is at the feedline 122). Note that a stop location of a segment is a start location of the next adjacent segment. The third column indicates number of wires Nf, . . . , Na in each segment.

The fourth column indicates effective cross-sectional area (in $mm^2$) of the wires of each segment. The effective cross-section of a segment is based on a number of wires in the segment. Thus, for a segment having a higher wire count, the effective cross-section is also corresponding higher.

The fifth column indicates weight of the wires for each segment. Here, 26 g copper wire is assumed to be used. The weight of wires in a given segment is based on the number of wires in the segment, as well as a length of the segment. The last column is an effective AWG of wires in each segment, which is based on a number of wires in the segments (note that an increase in AWG of a wire is associated with a decrease in the cross-sectional area of the wire).

Referring to the third column of the table 350, the segment 207*f* has 48 strands of wires 120 (e.g., Nf described with respect to FIG. 2 is 48). Also, number of wires Ne, Nd, Nc, Nb, Na of segments 207*e*, 207*d*, 207*c*, 207*b*, 207*a* are 36, 24, 12, 6, and 3, respectively, as illustrated in FIG. 3C. The number Nf is also referred to as $N_{str}$, as it is the number of wires in the starting segment 207*f* (when seen from the feedline 122 side of the antenna). The number of wires in the remaining segments are referred to as $N_{rem}$. Thus:

$$N_{str} = 48, \text{ and } N_{rem} = 36, 24, 12, 6, 3. \quad \text{Equation 16}$$

From equation 4 described above, assuming the resistivity $\dot{R}$ of copper as $1.724\times10^{-8}\Omega\cdot m$ and assuming use of 26 g copper wire, the resistance $\dot{R}_0$ of the segment having the 48 number of wires is calculated as:

$$\dot{R}_0 = \frac{1.724\times10^{-8}\ \Omega\cdot\text{m}}{48\times0.1288\times10^{-6}\ \text{m}^2} = 0.002789\ \frac{\Omega}{\text{m}}. \quad \text{Equation 17}$$

The termination or junction points for the various segments can be solved as follows:

$$x = L\left(1 - \sqrt{\frac{N_{rem}}{N_{str}}}\right) = 127, 239, 450, 614, 713 \text{ m}. \quad \text{Equation 18}$$

Thus, as seen in equation 18 and also in FIG. 3C, the segment 207*f* is between 0 and 127 m, the segment 207*e* is between 127 m and 239 m, the segment 207*d* is between 239 m and 450 m, and so on. The total length of the wires 120 is 950 m.

The total weight for the wires 120, including weights of all six segments, is 21.46 kg. This is a 40.5% reduction in copper mass compared to a scenario where the wire count was not tapered. The total power dissipation P for this example can be calculated as P=18.447 kW, which compares reasonably well with the total power dissipation of 10.379 kW (see equation 7 above) for a constant wire count and a 10 g copper wire. The total voltage drive V is 420.7 V, which compares reasonably well with the total voltage drive of 155.6 V (see equation 13 above) for a constant wire count and a 10 g copper wire.

In an example, without using the tapering of the wire count and for comparable antenna performance, the weight of the wires in the antenna can be as high as 52.6 kg. In contrast, the total weight for the wires 120, including weights of all six segments and the tapered wire count, is 21.46kg, which saves 31.3 kg of copper, making the antenna 100 lighter weight, without substantially compromising a performance of the antenna 100.

Figure 4A:
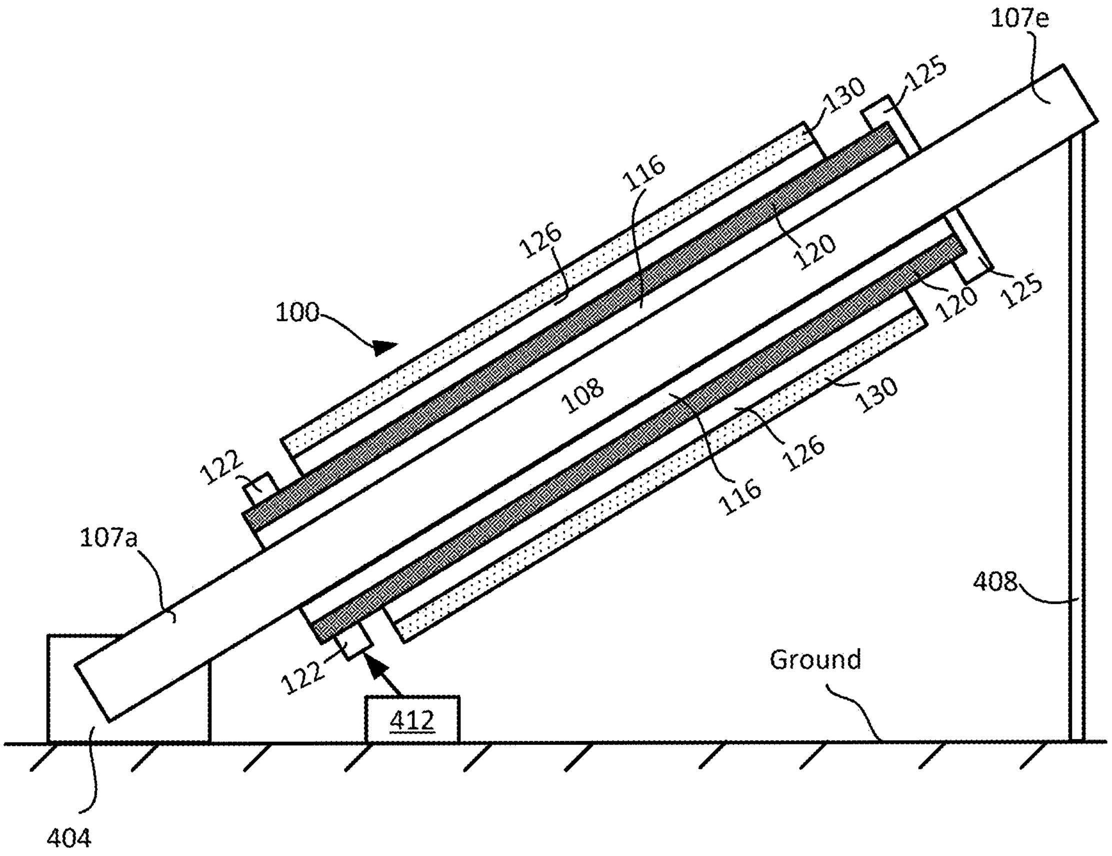
FIG. 4A illustrates a system comprising the antenna structure of FIGS. 1A-2, and attachment structures to tether the antenna structure, in accordance with an embodiment of the present disclosure.

FIG. 4A illustrates a system comprising the antenna structure 100 of FIGS. 1A-2, and attachment structures 404, 408 to tether the antenna structure 100, in accordance with an embodiment of the present disclosure. In one embodiment, the end sections 107*a* and/or 107*e* of the core 108 are used for tethering the antenna 100 to structures 404, 408, respectively. For example, the end section 107*a* is attached to a structure 404 that is on a ground surface (or another appropriate surface); and the end section 107*e* is attached to a structure 408 that is on a ground surface (or another appropriate surface). The structures 404 and 408 mechanically support and hold the antenna 100 in place during an operation of the antenna 100. A transmitter 412 is coupled to the feedline 122, for feeding signal for transmission by the antenna structure 100.

Figure 4B:
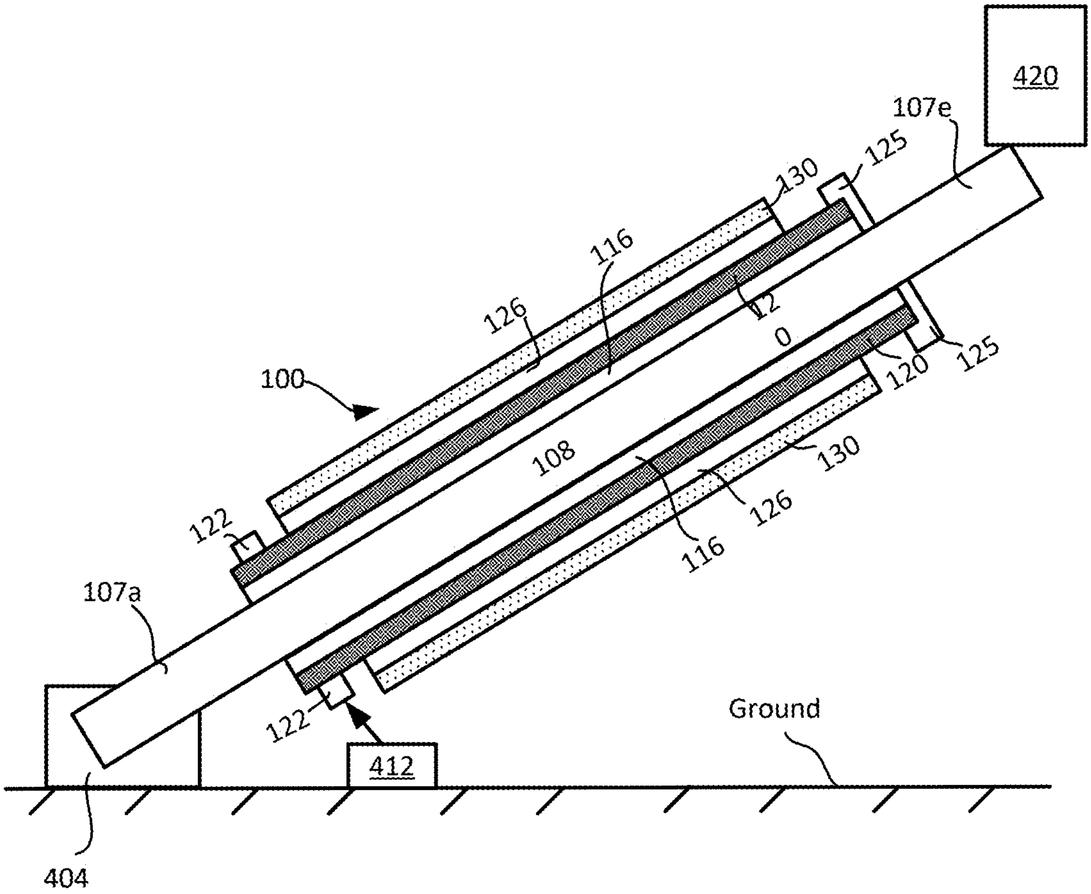
FIG. 4B illustrates another system comprising the antenna structure of FIGS. 1A-2, and a ground based attachment structure and an airborne device to tether the antenna structure, in accordance with an embodiment of the present disclosure.

FIG. 4B illustrates another system comprising the antenna structure 100 of FIGS. 1A-2, and a ground based attachment structure 404 and an airborne device 420 to tether the antenna structure 100, in accordance with an embodiment of the present disclosure. In one such embodiment, the end sections 107*a* and/or 107*e* of the core 108 are used for tethering the antenna 100 to structure 404 and the device 420, respectively. For example, the end section 107*a* is attached to a structure 404 that is on a ground surface (or another appropriate surface); and the end section 107*e* is attached to the device 420 that is airborne, such as an aerostat, a balloon, a dirigible, or a drone. Note that the airborne device 420 may be used to tether the antenna structure 100, and may also be used to transport the antenna structure 100 from one location to another. The structure 404 and the device 420 mechanically support and hold the antenna 100 in place during an operation of the antenna 100. In an example, the ground structure 404 may include a winch that deploys (and stows) the antenna structure 100 via the airborne device 420. In one example, the antenna tether is coupled to an airborne device and the core 108 has sufficient strength to retain the airborne device 420 in place. A transmitter 412 is coupled to the feedline 122, for feeding signal for transmission by the antenna structure 100. The transmitter 412 may be a ground based transmitter.

Further Example Examples

The following examples pertain to further examples, from which numerous permutations and configurations will be apparent.

Example 1. An integrated antenna and tether structure comprising: a core comprising a first dielectric material; a plurality of wires each comprising a first conductive material and wrapped around at least a section of the core; and a layer comprising a second dielectric material and a second conductive material on the second dielectric material, the second conductive material being in direct contact with one or more wires of the plurality of wires; wherein the layer is either (i) between the core and the plurality of wires, and wrapped around the core, or (ii) wrapped around the plurality of wires.

Example 2. The integrated antenna and tether structure of example 1, wherein the number of wires included in the plurality of wires progressively decreases along a length of the core, such that the number of wires included in the plurality of wires closest to a first end of the plurality of wires is at least 25% greater than the number of wires closest to a second end of the plurality of wires.

Example 3. The integrated antenna and tether structure of any one of examples 1-2, wherein the number of wires included in the plurality of wires progressively decreases along a length of the core, such that the number of wires included in the plurality of wires closest to a first end of the plurality of wires is at least 50% greater than the number of wires closest to a second end of the plurality of wires.

Example 3.a. The integrated antenna and tether structure of any one of examples 1-3, wherein the number of wires included in the plurality of wires progressively decreases along a length of the core, such that the number of wires included in the plurality of wires closest to a first end of the plurality of wires is at least 75% greater than the number of wires closest to a second end of the plurality of wires.

Example 3.b. The integrated antenna and tether structure of any one of examples 1-3.1, wherein the number of wires included in the plurality of wires progressively decreases along a length of the core, such that the number of wires included in the plurality of wires closest to a first end of the plurality of wires is at least 85% greater than the number of wires closest to a second end of the plurality of wires.

Example 4. The integrated antenna and tether structure of any one of examples 1-3, wherein the plurality of wires extends from a first end of the plurality of wires to a second end of the plurality of wires, and the number of wires included in the plurality of wires monotonically decreases along a length of the core and as the plurality of wires extend from the first end to the second end.

Example 5. The integrated antenna and tether structure of any one of examples 1-4, wherein the plurality of wires are braided around the first layer.

Example 6. The integrated antenna and tether structure of any one of examples 1-5, wherein the layer is a first layer that is between the core and the plurality of wires, and wrapped around the core, and wherein the integrated antenna and tether structure comprises: a second layer comprising a third dielectric material and a third conductive material on the third dielectric material, the second layer wrapped around the plurality of wires, and the third conductive material being in direct contact with one or more wires of the plurality of wires.

Example 7. The integrated antenna and tether structure of example 6, wherein the plurality of wires extends from a first end of the plurality of wires to a second end of the plurality of wires, the integrated antenna and tether structure comprising: a feedline coupled to a section of the plurality of wires closest to the first end and that is not warped around by the second layer; wherein a total number of wires included in the plurality of wires at the first end is at least 25% greater than a total number of wires included in the plurality of wires at the second end.

Example 8. The integrated antenna and tether structure of any one of examples 6-7, wherein: at least one of the first, second, and third dielectric materials is different from the other two, and each of the first, second, and third conductive materials are the same material; or at least two of the first, second, and third dielectric materials are the same material, and at least one of the first, second, and third conductive materials is different from the other two.

Example 9. The integrated antenna and tether structure of any one of examples 1-8, wherein: the core has a first end and a second end that are not wrapped by the layer; the first end of the core is configured to tether the integrated antenna and tether structure to an attachment structure, and/or the second end of the core is configured to tether the integrated antenna and tether structure to an airborne device.

Example 10. The integrated antenna and tether structure of any one of examples 1-9, wherein the antenna structure is configured to transmit signals at a frequency of at most 50 Megahertz (MHz), and the antenna structure has a length of at least 20 meters.

Example 11. The integrated antenna and tether structure of any one of examples 1-10, wherein the first dielectric material of the core comprises one or more of ultra-high-molecular-weight polyethylene (UHMWPE), aromatic polyamide (aramid), liquid crystalline polymer, or poly (p-phenylene-2,6-benzobisoxazole) synthetic polymer, and wherein the second dielectric material of the layer comprises polyimide Example 12. The integrated antenna and tether structure of any one of examples 1-11, wherein: the core extending from a first end to a second end has a first length; the plurality of wires is wrapped around a first subset of the first length, and not around an entirety of the first length; and the layer comprising the second dielectric material and the second conductive material is along a second subset of the first length, and not along an entirety of the first length, wherein the first subset and the second subset are different.

Example 13. The integrated antenna and tether structure of any one of examples 1-12, wherein the first conductive material comprises at least one of aluminum or copper, and the second conductive material comprises aluminum.

Example 14. The integrated antenna and tether structure of any one of examples 1-13, wherein the layer is in a form of tape or film comprising metalized dielectric material.

Example 15. A system comprising: an attachment structure to tether to a first end of the core of the antenna structure of any one of examples 1-14; and an airborne device to tether to a second end of the core of the antenna structure of any one of examples 1-14.

Example 16. An antenna structure comprising: a core comprising a dielectric material; and a plurality of wires comprising a conductive material and wrapped around at least a section of the core; wherein a wire count of the plurality of wires changes at a junction along a length of the core, such that a count of the plurality of wires within a first segment that is on a first side of the junction is different from a count of the plurality of wires within a second segment that is on an opposing second side of the junction.

Example 17. The antenna structure of example 16, wherein: the junction is a first junction; a second junction is along the length of the core, such that (i) the first segment is on the first side of the first junction, (ii) the second segment is on the second side of the first junction and a first side of the second junction, such that the second segment is between the first and second junctions, and (iii) a third segment is on a second side of the second junction that is opposite of the first side of the second junction; and the first segment of the plurality of wires has a first wire count, the second segment of the plurality of wires has a second wire count, and the third segment of the plurality of wires has a third wire count, wherein the first, second, and third counts are different from each other.

Example 18. The antenna structure of example 17, wherein the dielectric material is a first dielectric material, and wherein the antenna structure comprises: a layer comprising a second dielectric material and a second conductive material thereon, such that the second conductive material is in direct contact with one or more wires of the plurality of wires; wherein the layer is wrapped around the core, and either (i) between the core and the plurality of wires, or (ii) wrapped around the plurality of wires.

Example 19. A system comprising: a core comprising a dielectric material; a first structure to tether to a first end of the core; and a second structure to tether to a second end of the core; and a plurality of wires comprising a conductive material woven around at least a section of the core, wherein a wire count of the plurality of wires changes along a length of the core.

Example 20. The system of example 19, comprising: a feedline at a first end of the plurality of wires; and a termination component at a second end of the plurality of wires; wherein a wire count of the plurality of wires at or near the feedline is higher than a wire count of the plurality of wires at or near the termination component.

Numerous specific details have been set forth herein to provide a thorough understanding of the examples. It will be understood, however, that other examples may be practiced without these specific details, or otherwise with a different set of details. It will be further appreciated that the specific structural and functional details disclosed herein are representative of examples and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. Furthermore, examples described herein may include other elements and components not specifically described, such as electrical connections, signal transmitters and receivers, processors, or other suitable components for operation of the antenna system 100.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and examples have been described herein. The features, aspects, and examples are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

The invention claimed is:

1. An integrated antenna and tether structure comprising:

a core comprising a first dielectric material;

a plurality of wires each comprising a first conductive material and wrapped around at least a section of the core; and a layer comprising a second dielectric material and a second conductive material on the second dielectric material, the second conductive material being in direct contact with one or more wires of the plurality of wires;

wherein the layer is either (i) between the core and the plurality of wires, and wrapped around the core, or (ii) wrapped around the plurality of wires; and wherein a number of wires included in the plurality of wires progressively decreases along a length of the core, such that the number of wires included in the plurality of wires closest to a first end of the plurality of wires is at least 25% greater than the number of wires closest to a second end of the plurality of wires.

2. The integrated antenna and tether structure of claim 1, wherein the number of wires included in the plurality of wires progressively decreases along a length of the core, such that the number of wires included in the plurality of wires closest to a first end of the plurality of wires is at least 50% greater than the number of wires closest to a second end of the plurality of wires.

3. The integrated antenna and tether structure of claim 1, wherein the plurality of wires extends from a first end of the plurality of wires to a second end of the plurality of wires, and the number of wires included in the plurality of wires monotonically decreases along a length of the core and as the plurality of wires extend from the first end to the second end.

4. The integrated antenna and tether structure of claim 1, wherein the plurality of wires are braided around the layer.

5. The integrated antenna and tether structure of claim 1, wherein the layer is a first layer that is between the core and the plurality of wires, and wrapped around the core, and wherein the integrated antenna and tether structure comprises:

a second layer comprising a third dielectric material and a third conductive material on the third dielectric material, the second layer wrapped around the plurality of wires, and the third conductive material being in direct contact with one or more wires of the plurality of wires.

6. The integrated antenna and tether structure of claim 5, wherein the plurality of wires extends from the first end of the plurality of wires to the second end of the plurality of wires, the integrated antenna and tether structure comprising:

a feedline coupled to a section of the plurality of wires closest to the first end and that is not wrapped around by the second layer.

7. The integrated antenna and tether structure of claim 5, wherein:

at least one of the first, second, and third dielectric materials is different from the other two, and each of the first, second, and third conductive materials are the same material; or at least two of the first, second, and third dielectric materials are the same material, and at least one of the first, second, and third conductive materials is different from the other two.

8. The integrated antenna and tether structure of claim 1, wherein:

- the core has a first end and a second end that are not wrapped by the layer;
- the first end of the core is configured to tether the integrated antenna and tether structure to an attachment structure, and/or the second end of the core is configured to tether the integrated antenna and tether structure to an airborne device.

9. The integrated antenna and tether structure of claim 1, wherein the antenna structure is configured to transmit signals at a frequency of at most 50 Megahertz (MHz), and the antenna structure has a length of at least 20 meters.

10. The integrated antenna and tether structure of claim 1, wherein the first dielectric material of the core comprises one or more of ultra-high-molecular-weight polyethylene (UHMWPE), aromatic polyamide (aramid), liquid crystalline polymer, or poly (p-phenylene-2,6-benzobisoxazole) synthetic polymer, and wherein the second dielectric material of the layer comprises polyimide.

11. The integrated antenna and tether structure of claim 1, wherein:

- the core extending from a first end to a second end has a first length;
- the plurality of wires is wrapped around a first subset of the first length, and not around an entirety of the first length; and the layer comprising the second dielectric material and the second conductive material is along a second subset of the first length, and not along an entirety of the first length, wherein the first subset and the second subset are different.

12. The integrated antenna and tether structure of claim 1, wherein the first conductive material comprises at least one of aluminum or copper, and the second conductive material comprises aluminum.

13. The integrated antenna and tether structure of claim 1, wherein the layer is in a form of tape or film comprising metalized dielectric material.

14. A system comprising:

- an attachment structure to tether to a first end of the core of the antenna structure of claim 1; and an airborne device to tether to a second end of the core of the antenna structure of claim 1.

15. An antenna structure comprising:

- a core comprising a dielectric material; and
- a plurality of wires comprising a conductive material and wrapped around at least a section of the core;

wherein a wire count of the plurality of wires changes at a junction along a length of the core, such that a count of the plurality of wires within a first segment that is on a first side of the junction is different from a count of the plurality of wires within a second segment that is on an opposing second side of the junction.

16. The antenna structure of claim 15, wherein:

the junction is a first junction;

a second junction is along the length of the core, such that (i) the first segment is on the first side of the first junction, (ii) the second segment is on the second side of the first junction and a first side of the second junction, such that the second segment is between the first and second junctions, and (iii) a third segment is on a second side of the second junction that is opposite of the first side of the second junction; and the first segment of the plurality of wires has a first wire count, the second segment of the plurality of wires has a second wire count, and the third segment of the plurality of wires has a third wire count, wherein the first, second, and third counts are different from each other.

17. The antenna structure of claim 16, wherein the dielectric material is a first dielectric material, and wherein the antenna structure comprises:

- a layer comprising a second dielectric material and a second conductive material thereon, such that the second conductive material is in direct contact with one or more wires of the plurality of wires;
- wherein the layer is wrapped around the core, and either (i) between the core and the plurality of wires, or (ii) wrapped around the plurality of wires.

18. A system comprising:

a core comprising a dielectric material;

a first structure to tether to a first end of the core; and a second structure to tether to a second end of the core; and a plurality of wires comprising a conductive material woven around at least a section of the core, wherein a wire count of the plurality of wires changes along a length of the core.

19. The system of claim 18, comprising:

a feedline at a first end of the plurality of wires; and a termination component at a second end of the plurality of wires;

wherein a wire count of the plurality of wires at or near the feedline is higher than a wire count of the plurality of wires at or near the termination component.

* * * * *